(12) United States Patent
Maruoka (10) Patent No.: US 11,037,224 B2
(45) Date of Patent: Jun. 15, 2021

(54) SYSTEM AND METHOD FOR PROVIDING WINE TO CUSTOMER, AND SERVER DEVICE AND PROGRAM USED IN THIS SYSTEM

(71) Applicant: Broad Edge Liqueur, Inc., Tokyo (JP)

(72) Inventor: Eishi Maruoka, Tokyo (JP)

(73) Assignee: Broad Edge Liqueur, Inc., Tokyo (JP)

( * ) Notice: Subject to any disclaimer, the term of this patent is extended or adjusted under 35 U.S.C. 154(b) by 29 days.

(21) Appl. No.: 16/492,749

(22) PCT Filed: Apr. 19, 2018

(86) PCT No.: PCT/JP2018/016141
§ 371 (c)(1),
(2) Date: Sep. 10, 2019

(87) PCT Pub. No.: WO2018/198931
PCT Pub. Date: Nov. 1, 2018

(65) Prior Publication Data
US 2020/0074533 A1  Mar. 5, 2020

(30) Foreign Application Priority Data

Apr. 27, 2017 (JP) .............................. JP2017-088384
Dec. 25, 2017 (JP) .............................. JP2017-248006

(51) Int. Cl.
*G06Q 30/00* (2012.01)
*G06Q 30/06* (2012.01)
(Continued)

(52) U.S. Cl.
CPC ..... *G06Q 30/0641* (2013.01); *G06Q 30/0283* (2013.01); *G06Q 30/0603* (2013.01); *G06Q 50/12* (2013.01)

(58) Field of Classification Search
CPC .................................................. G06Q 30/0641
See application file for complete search history.

(56) References Cited

U.S. PATENT DOCUMENTS

2007/0106617 A1* 5/2007 Mabray .................. G06Q 30/06
705/59
2014/0164046 A1* 6/2014 Haralambos ........... G06Q 20/18
705/7.25

FOREIGN PATENT DOCUMENTS

JP        200011034 A     1/2000
JP        2001306903 A   11/2001
(Continued)

OTHER PUBLICATIONS

Barth, JE Joe. "A model for wine list and wine inventory yield management." International Journal of Hospitality Management 30.3 (2011): 701-707.*

(Continued)

*Primary Examiner* — Kathleen Palavecino
(74) *Attorney, Agent, or Firm* — Renner, Otto, Boisselle & Sklar, LLP (57) ABSTRACT

An objective is to provide a system for providing wine to a customer. This system is equipped with a wine storage facility for storing wine, wherein wine is deposited in the wine storage facility, and a means for issuing a bill for the wine when wine in the wine storage facility is provided to a customer. This system may also be equipped with a management means for managing wine selection in the wine storage facility.

12 Claims, 8 Drawing Sheets

(51) Int. Cl.
*G06Q 30/02* (2012.01)
*G06Q 50/12* (2012.01)

(56) References Cited

FOREIGN PATENT DOCUMENTS

| | | |
|---|---|---|
| JP | 200292506 A | 3/2002 |
| JP | 2002167047 A | 6/2002 |
| JP | 200421489 A | 1/2004 |
| JP | 201465583 A | 4/2014 |

OTHER PUBLICATIONS

International Search Report for related International Application No. PCT/JP2018/016141 dated Jun. 6, 2018 and its English translation.
European Search Report for related Application No. 18790830.6 dated Aug. 10, 2020.

* cited by examiner

SYSTEM AND METHOD FOR PROVIDING WINE TO CUSTOMER, AND SERVER DEVICE AND PROGRAM USED IN THIS SYSTEM

TECHNICAL FIELD

The present invention relates to a system and a method for providing wine to a customer and a server apparatus and a program used in the system.

BACKGROUND ART

Conventionally, wine has been provided to consumers through manufacturers, importers, wholesalers and sellers.

SUMMARY OF INVENTION

Technical Problem

Wholesalers of wine merely played an intermediary role for conveying wine ordered from eating and drinking places that sell wine to importers. Therefore, eating and drinking places had to assort and store wine by themselves and the eating and drinking places had to take the inventory risk of wine. Therefore, it was common for eating and drinking places to sell wine for the price that is two to three times the price, in some cases, ten times the price, that is circulating on the internet. Since wine is sold at a high price in eating and drinking places as in the above, there had been a vicious cycle of not having growth in consumption of wine at eating and drinking places and ending up with an even higher price of wine sold in the eating and drinking places.

The applicant thought that it is possible to generate profit for three parties, the "wholesalers" who sell wine wholesale, "sellers" who sell wine and "customers" to whom wine is sold, by creating a new service for providing wine to a customer. Furthermore, the applicant thought that it is possible to generate profit for five parties, the three parties of "wholesalers", "sellers" and "customers" with an addition of two parties, "manufacturers" and "importers" (i.e., all business operators involved in the wine circulation process).

The purpose of the present invention is to provide a system and a method enabling creation of a new service for providing wine to a customer, and a server apparatus and a program used in the system.

Solution to Problem

In one aspect of the present invention, a system for providing wine to a customer comprises a wine storage facility for storing wine, wherein wine is deposited in the wine storage facility and a means for imposing fee for wine when wine in the wine storage facility is provided to a customer.

In one embodiment of the present invention, a management means that manages assortment of wine in the wine storage facility may be further comprised.

In one embodiment of the present invention, the management means may update data showing assortment of wine in the wine storage facility when wine is deposited in the wine storage facility or when wine is taken out from the wine storage facility.

In one embodiment of the present invention, the management means may further comprise a means that decides whether or not wine in the wine storage facility should be collected from the wine storage facility.

In one embodiment of the present invention, the management means may determine to move wine to a location other than the wine storage facility in a case wherein it is decided that wine in the wine storage facility should be collected from the wine storage facility.

In one embodiment of the present invention, a detection means that detects that wine has been taken out from the wine storage facility may be further comprised, wherein a means for imposing fee for wine may impose fee for wine in response to the detection means detecting that wine was taken out from the wine storage facility.

In one embodiment of the present invention, a means that enables a customer to search providable wine of the wholesaler through a web site may be further comprised.

In one embodiment of the present invention, a means that presents a wine list wherein a wine providing price and a wine reference price are written together may be further comprised, wherein the wholesaler may have a right to determine the wine providing price.

In one embodiment of the present invention, wine information inserted in the wine list may be based on wine stored in the wine storage facility.

In one embodiment of the present invention, the wine storage facility may be set in a seller's store and a means for imposing fee for wine may impose fee for wine on a seller of wine.

In one embodiment of the present invention, the wine storage facility may be set at a location other than a seller's store.

In one aspect of the present invention, a method for providing wine to a customer comprises depositing wine in a wine storage facility and imposing fee for wine when wine in the wine storage facility is provided to a customer.

In one aspect of the present invention, a system for providing wine to a customer comprises a server apparatus and a client apparatus, wherein the server apparatus is configured to be able to communicate with the client apparatus through a network, wherein wine is deposited in a wine storage facility, wherein the client apparatus transmits information regarding wine to the server apparatus through the network when wine in the wine storage facility is provided to a customer, wherein the server apparatus performs a processing of imposing fee for wine based on the information regarding wine transmitted from the client apparatus through the network.

In one aspect of the present invention, there is a server apparatus used in a system for providing wine to a customer, wherein the server apparatus is configured to be able to communicate with a client apparatus through a network, wherein wine is deposited in a wine storage facility, wherein the server apparatus comprises a processor part, wherein the processor part is configured to perform a processing of imposing fee for wine base on the information regarding wine transmitted from the client apparatus through the network.

In one aspect of the present invention, the program of the present invention is a program performed in a server apparatus used in a system for providing wine to a customer, wherein the server apparatus is configured to be able to communicate with a client apparatus through a network, wherein wine is deposited in a wine storage facility, wherein the server apparatus comprises a processor part, wherein when performed by the processor part, the program have the processor part perform a processing of imposing fee for wine based on the information regarding wine transmitted from the client apparatus through the network.

Advantageous Effects of Invention

According to the present invention, it is possible to provide a system and a method enabling creation of a new service for providing wine to a customer, and a server apparatus and a program used in the system.

DESCRIPTION OF EMBODIMENTS

An embodiment of the present application is explained below while referring to the drawings.
1. A New Service for Providing Wine to a Customer The applicant suggests creation of a new service for providing wine to a customer. This new service enables provision of wine to a customer at a reasonable price ("fair value") in a seller's store (for example, an eating and drinking place) by a wholesaler depositing wine in the seller's store and the wholesaler imposing fee for wine on the seller when the deposited wine is provided to a customer.

In addition, this new service utilizes a characteristic unique to wine which is that as long as wine is appropriately stored, the wine does not decrease in value but rather increases in value over time. Generally, an expiration date is not set for unopened wine. This is because maturation of wine progresses over time under the condition of being stored under an appropriate environment.

The new service for providing wine to a customer comprises a "service for a seller's store", a "service for a consumer" and a "service on a network". Hereafter, these new services are explained in detail.

Figure 1A:
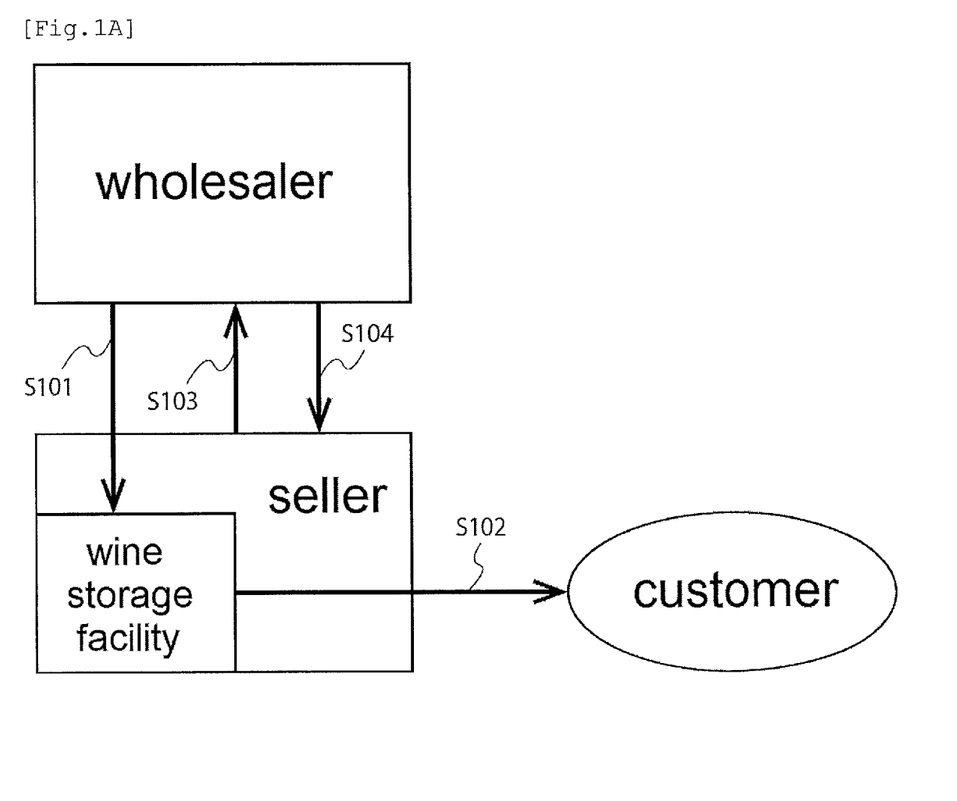
[FIG. 1A] A drawing showing one example of a flow of a new service provided as a "service for a seller's store".

FIG. 1A shows one example of a flow of the new service provided as the "service for a seller's store".

Step S101: A wholesaler deposits wine owned by the wholesaler to a wine storage facility of a seller's store (for example, an eating and drinking place such as a restaurant, retail store, or the like).

Step S102: The seller provides wine stored in the wine storage facility to a customer.

As described above, it is possible to provide wine to a customer by a wholesaler depositing the wine owned by the wholesaler in a wine storage facility of a seller's store and the seller providing the wine stored in the wine storage facility to the customer.

In the present specification, "deposit" means placement without charge. Whether or not the ownership of "deposited" wine had been transferred from a wholesaler to a seller is not an issue in the above. For example, in a case wherein a wholesaler has the ownership of wine, placement of wine in a wine storage facility of a seller's store is one example of "depositing wine in a wine storage facility". Alternatively, in a case wherein the ownership of wine is transferred from a wholesaler to a seller, placement of wine in a wine storage facility of a seller's store in a state wherein the wholesaler is extending charge against the seller is also one example of "depositing wine in a wine storage facility". In one example wherein the ownership of wine is transferred from a wholesaler to a seller, extension of charging fee for wine is cancelled at the time point when the wine is provided to a customer (for example, at the time point when the wine is uncorked in the seller's store). The fee for wine will not be charged at the time point when a wholesaler deposited the wine in a wine storage facility. Wine deposited in a wine storage facility will substantially be stored in the wine storage facility as an "inventory of the wholesaler". This is because fee for wine will not be charged unless the wine is provided to a customer as described below.

In addition, the work procedures necessary for depositing wine in a wine storage facility (for example, work procedures such as selection/order/stocking of wine, determination of customer providing price and the like) are all carried out by a wholesaler under the responsibility of the wholesaler. This releases a seller from work procedures such as selection/order/stocking of wine, determination of customer providing price and the like. In a case wherein wine is sold in a seller's store, the sellers will receive sales commission as the seller's share. The sales commission can be, for example, a flat rate system of a certain price per one bottle of wine, or a fluctuation system. For example, the sales commission is determined by, but not limited to, negotiation between a wholesaler and a seller.

Furthermore, wine deposited in a wine storage facility is handled as an "inventory of the wholesaler" and not as an "inventory of the seller". Accordingly, as long as a seller appropriately carries out management of a wine storage facility, the seller will not bear the inventory risk of wine. In this regard, for example, the management of a wine storage facility refers to, but not limited to, retention of temperature or humidity in the wine storage facility within a predetermined range.

A wholesaler can collect wine deposited in a wine storage facility. For example, in a case wherein there is wine that is still deposited in a wine storage facility even though a predetermined period of time has passed from the time point of deposit, a wholesaler can collect the wine. A seller will not bear the inventory risk of wine as long as the wine storage facility is appropriately managed. Furthermore, since the wine has not been sold upon collection of the wine, the wholesaler can collect the wine without causing the seller trouble.

Even if a wholesaler had collected wine deposited in a wine storage facility, the wholesaler will not suffer a loss in the collection of the wine as long as the seller is appropriately carrying out management of the wine storage facility. This is because the wholesaler can increase the value of the wine by further maturing the wine after the collection of the wine and can increase the sales opportunity of the wine by moving the collected wine to a wine storage facility of another store different from the wine storage facility of the store where the wine had been deposited. Accordingly, the wholesaler does not need to set the price upon providing the wine to a customer (customer providing price) as high as in the past. Rather, the wholesaler can increase profit without setting a high price upon providing the wine to a customer (customer providing price) by increasing the number of stores of sellers under the influence.

In addition, a service for managing inventory of wine in a wine storage facility can be provided to a seller through a network such as the internet or an application program as one of the "service for a seller's store". In a case wherein the service for managing inventory of wine in a wine storage facility is provided by, for example, an application program installed in a user apparatus such as a smart phone, a seller can confirm current inventory situation of wine and sales price of wine upon activation of the application program using the user apparatus. For example, when wine is provided to a customer, when wine is collected, or when wine is supplemented, the current inventory situation of the wine is updated and the sales price of the wine is updated when, for example, a predetermined period of time has passed.

Step S103: The seller will provide the wholesaler information regarding the wine provided to the customer in step S102. The timing of providing the wholesaler the information regarding the wine is preferable to be, but not limited to, right after the wine has been provided to the customer. The timing of providing the wholesaler the information regarding the wine can be, for example, after a predetermined time has passed, or right after the work procedures of the day have been completed. It is preferable that several pieces of information regarding wine be collectively provided to the wholesaler.

The wholesaler imposes fee for the wine on the seller based on the information regarding the wine provided by the seller in step S103. In the present specification, "imposing fee for wine on a seller" includes preparation of charge for charging fee for wine to a seller, which does not necessarily requires issuing of an invoice for charging the fee for the wine to the seller.

Step S104: The wholesaler charges the fee for the wine to the seller. For example, the timing of charging the fee for the wine to the seller is, but not limited to, a predetermined timing such as at the end of the month, end of the week, or the like. The timing of charging the fee for the wine to the seller can be at any timing. For example, the timing of charging the fee for the wine to the seller can be right after the information regarding the wine has been provided to the wholesaler. Such charging timing is useful, for example, in a case wherein the fee for the wine is expensive.

Furthermore, the present specification defines that "when wine is provided to a customer" also includes when wine has already been provided to a customer in addition to when wine is going to be provided to a customer in the future. For example, "when wine is provided to a customer" includes "when wine is ordered", "when wine is taken out from a wine storage facility", "when wine is uncorked" and "when payment processing of wine has been carried out".

Figure 1B:
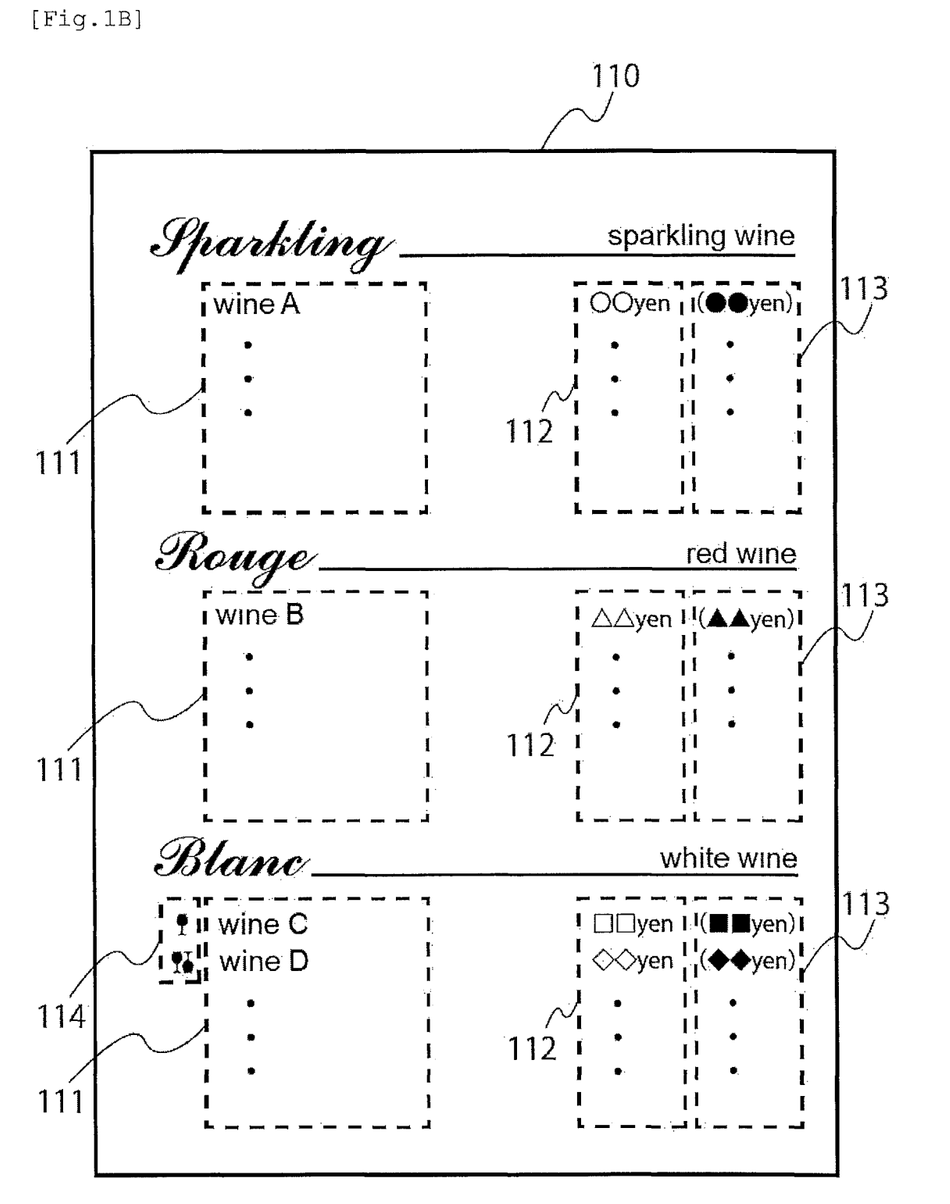
[FIG. 1B] A drawing showing one example of a wine list 110 provided to a customer in a seller's store as one example of a new service provided as a "service for a consumer".

FIG. 1B shows one example of a wine list 110 provided to a customer in a seller's store as one example of the new service provided as the "service for a consumer". Furthermore, the wine information inserted in the wine list 110 is based on the wine stored in the wine storage facility.

The wine list 110 comprises a brand region 111 wherein a brand of wine is described, a providing price region 112 wherein a providing price of wine is described and a reference price region 113 wherein a reference price of wine is described. A symbol 114 explaining a special notation (for example, now is the suitable time to drink the wine, the wine is currently provided in a reasonable price, or now is the suitable time to drink the wine and the wine is currently provided in a reasonable price) of the wine described in the wine list 110 can also be described in the wine list 110. In the example shown in FIG. 1B, the wine list 110 describes each of the following prices: a providing price of sparkling wine A "○○yen"; a reference price of sparkling wine A "●● yen"; a providing price of red wine B "ΔΔyen"; a reference price of red wine B "▲▲yen"; a providing price of white wine C "□□yen"; a reference price of white wine C "■■yen"; a providing price of white wine D "◇◇yen"; and a reference price of white wine D "◆◆yen". In this regard, numbers will be applied to ○, ●, Δ, ▲, □, ■, ◇ and ◆. As shown in FIG. 1B, a providing price of wine and reference price of wine can be written together. The providing price of wine described in the providing price region 112 is determined by a wholesaler as described above. For example, the reference price of wine described in the reference price region 113 is, but not limited to, one of the plurality of prices inserted on the internet, the maximum value of the plurality of prices inserted on the internet, the minimum value of the plurality of prices inserted on the internet, or the average value of the plurality of prices inserted on the internet.

The wine list 110 is provided from a wholesaler to a seller and presented to a customer in the seller's store. For example, the wine list 110 is provided from a wholesaler to a seller at the same time when the wholesaler deposits wine to the seller in step 101. Because the wholesaler determines the brand of the wine to be deposited, assorts the wine, determines a providing price of the wine and deposits the wine to the seller in the service shown in FIG. 1A, the wholesaler can provide such a wine list 110 to the seller and eventually to a customer. In addition, the mode of presenting the wine list 110 can be any mode. A wine list 110 printed on a paper can be presented to a customer, the wine list 110 can be displayed on an apparatus (for example, cell phone, smartphone, tablet terminal, smart glass, smart watch terminal) owned by a store, or the wine list 110 can be displayed on user apparatus (for example, cell phone, smartphone, tablet terminal, smart glass, smart watch terminal) owned by a customer.

Figure 1C:
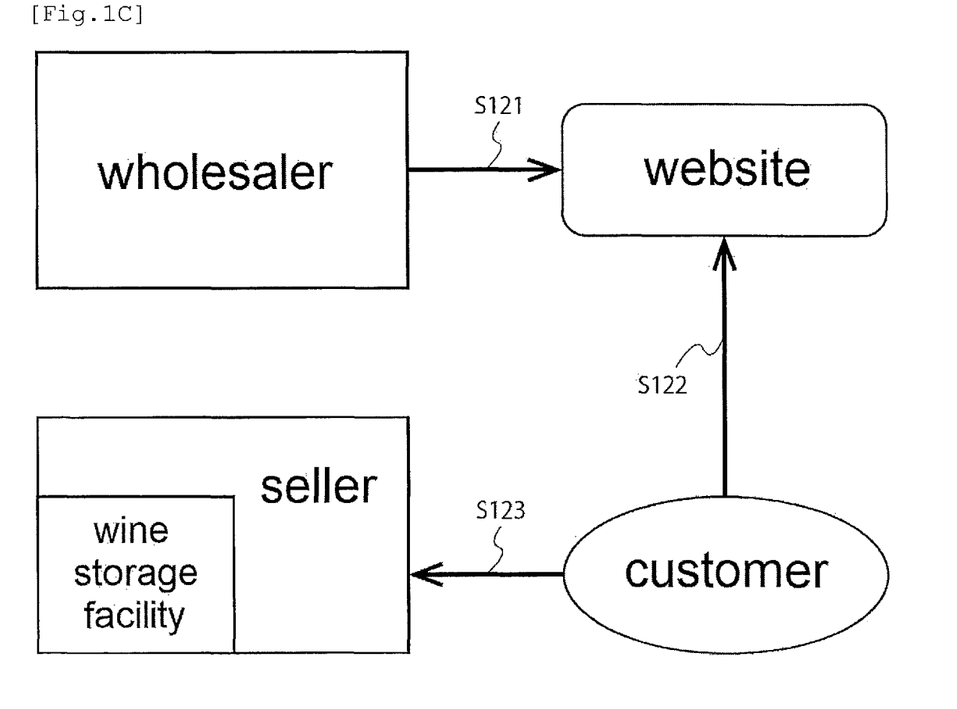
[FIG. 1C] A drawing showing one example of a flow of a new service provided as a "service on a network".

FIG. 1C shows one example of a flow of a new service provided as the "service on a network".

Step S121: The wholesaler inserts information regarding wine (for example, the brand of wine, customer providing price, reference price, special notation) and information of a store that can provide the wine (for example, the store's name, address, workday (holiday)/working hours, access method) on a website. For example, the reference price inserted on the website is, but not limited to, the same price as in the price of wine that is the same brand inserted in one price search site, the maximum price among the prices of wine that is the same brand inserted in a plurality of price search sites, the minimum price among the prices of wine that is the same brand inserted in a plurality of price search sites, or the average price among the prices of wine that is the same brand inserted in a plurality of price search sites. Vintage charts, a manufacturer's grading information, consideration information of a suitable time to drink the wine and the like can also be inserted in the website to support a customer's wine selection. This website is configured so that a customer can search a desired wine (for example, by inputting a brand of wine). The wine information inserted in this website is based on wine deposited by the wholesaler in the wine storage facility (for example, wine cellar) of the seller's store.

Step S122: The customer accesses information regarding wine and information regarding stores inserted in the website using the user apparatus. In addition, a user ID and a password is required to be registered beforehand in order to enter this website and the user ID and password can be used to allow access to the information regarding wine and the information regarding stores. The customer can identify the store that provides the wine the customer wants to drink by accessing the information regarding the wine and the information regarding stores.

Step S123: The customer actually visits the identified store.

As a "service on a network", the new service for providing wine to a customer can include a service that matches a user A, who wants to sell the wine the user A owns, and a user B, who wants to purchase the wine, other than the service shown in FIG. 1C. This matching service has a mechanism wherein the user A, who wants to sell the wine the user A owns, exhibits the wine to a market and the user B, who wants to purchase the wine, successfully bids (purchases) the exhibited wine. Assessment (ranking) of the wine will be given to the wine when the user A exhibits the wine. The user B can successfully bid (purchase) the wine while referring to this assessment (ranking) of the wine.

According to the new service described above, it is possible to generate profit for three parties, the "wholesalers" who sell wine wholesale, "sellers" who sell wine and "customers" to whom wine is sold. Specifically, for a wholesaler, the storage cost of wine is zero since wine can be deposited in a wine storage facility of a seller and inventory risk of the wine is almost nonexistent since the price of the wine will rise if the wine is appropriately stored. For a seller, inventory risk of wine is almost nonexistent since imposition of fee will not occur until when wine is actually provided to a customer and there is no labor for assorting wine or the like. Since the risks for a wholesaler and a seller are small as described above, it is possible to provide wine to a customer in a seller's store at a low price. Therefore, the above-described new service generates profit for three parties, the "wholesalers", "sellers" and "customers".

The above-described new service generates profit for three parties, the "wholesalers", "sellers" and "customers" and as a result, the reputation and level of recognition of the "sellers" improve, the ability to attract customers of the "sellers" improves, the number of "sellers" in cooperation with the "wholesalers" increases and the amount of wine handled by the "wholesalers" increases. For the "manufacturers" and "importers", there is a benefit of securing "wholesalers" with a lot of amount of wine to handle. This is because it is possible to secure the sale destination of wine manufactured by the "manufacturers" and imported by the "importers" and the security of sale destination of wine leads to security of the profit of the "manufactures" themselves and the "importers" themselves. Therefore, it is considered that the above-described new service directly or indirectly generates profit for five parties, the "manufacturers", "importers", "wholesalers", "sellers" and "customers".

2. Configuration of the System for Providing Wine to a Customer

Figure 2:
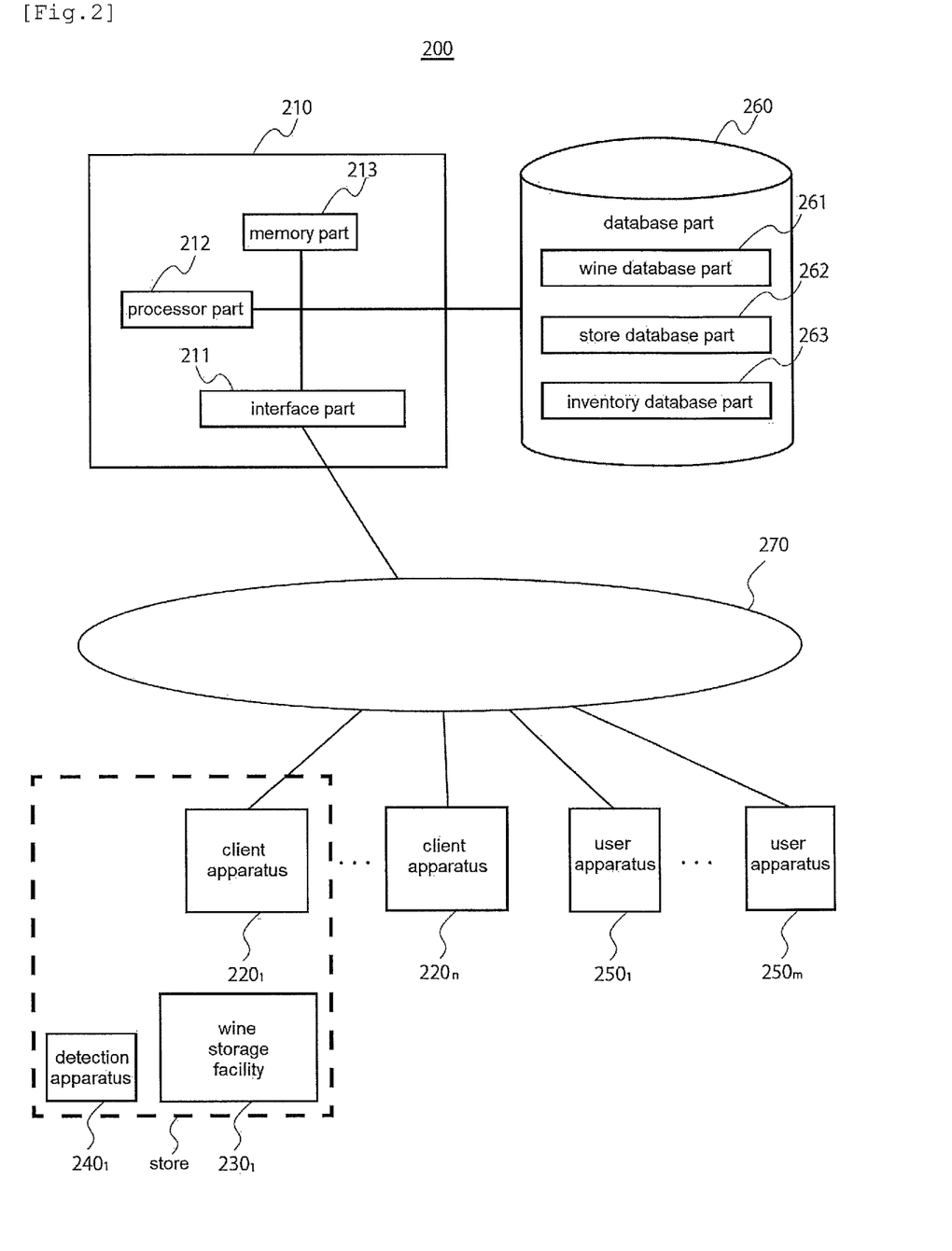
[FIG. 2] A drawing showing one example of a configuration of a system 200 for providing wine to a customer.

FIG. 2 shows one example of a configuration of a system 200 for providing wine to a customer. This system 200 is used for creating a new service for providing wine to a customer.

The system 200 comprises a server apparatus 210 that performs a processing for a wholesaler, at least one client apparatuses $220_1$ to $220_n$ that performs a processing for a seller's store that sells wine, a wine storage facility 230 wherein wine assorted by the wholesaler is deposited for storage, a detection apparatus 240 that detects that wine stored in the wine storage facility 230 has been taken out from the wine storage facility 230, at least one user apparatuses $250_1$ to $250_m$ used by a customer, and a database part 260 connected to the server apparatus 210. The at least one client apparatuses $220_1$ to $220_n$ and the at least one user apparatuses $250_1$ to $250_m$ are configured to be able to communicate with the server apparatus 210 through the Internet 270. In this regard, n and m are any integral number that is 1 or higher.

The server apparatus 210 is an information processing apparatus administered/managed by a wholesaler that integrates a system for providing wine to a customer. The server 210 is, for example, a work station or a personal computer, which has a common hardware configuration as a server. In the example shown in FIG. 2, the server apparatus 210 comprises an interface part 211, a processor part 212 comprising one or more CPU (Central Processing Unit) and a memory part 213. The hardware configuration of the server apparatus 210 is not particularly limited as long as the function thereof is realized and the hardware configuration of the server apparatus 210 can be configured with a single machine or configure by combining a plurality of machines.

The interface part 211 controls the communication between the at least one client apparatuses $220_1$ to $220_n$ and the communication between the at least one user apparatuses $250_1$ to $250_m$.

Figure 4:
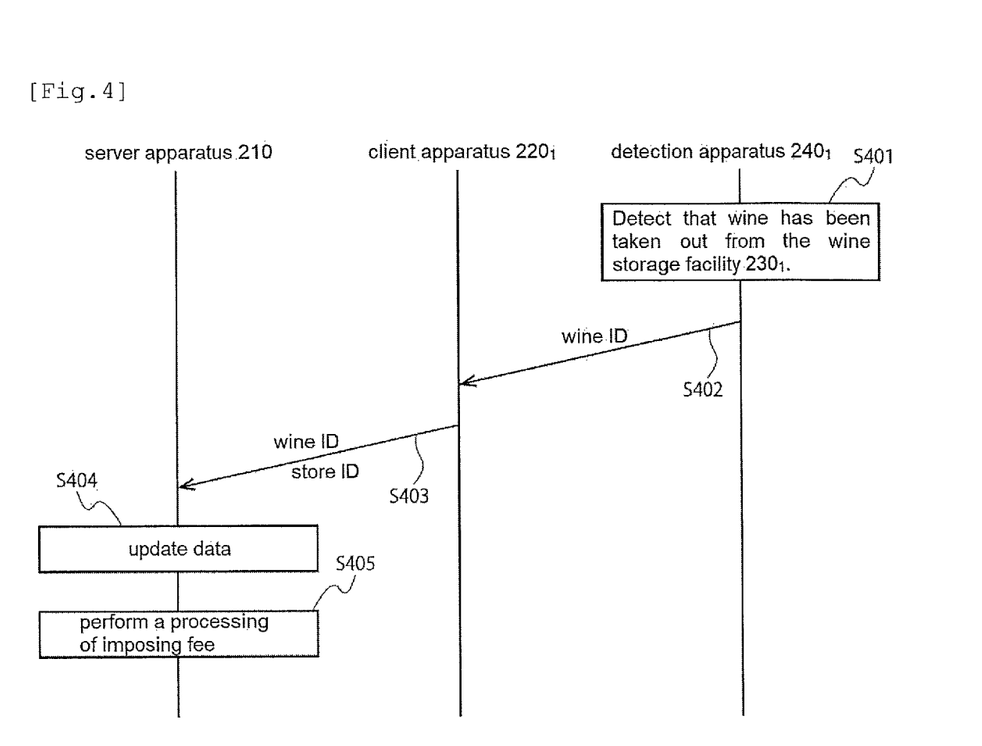
[FIG. 4] A drawing of one example of a flow of a processing performed in a system 200 for providing wine to a customer.
Figure 5:
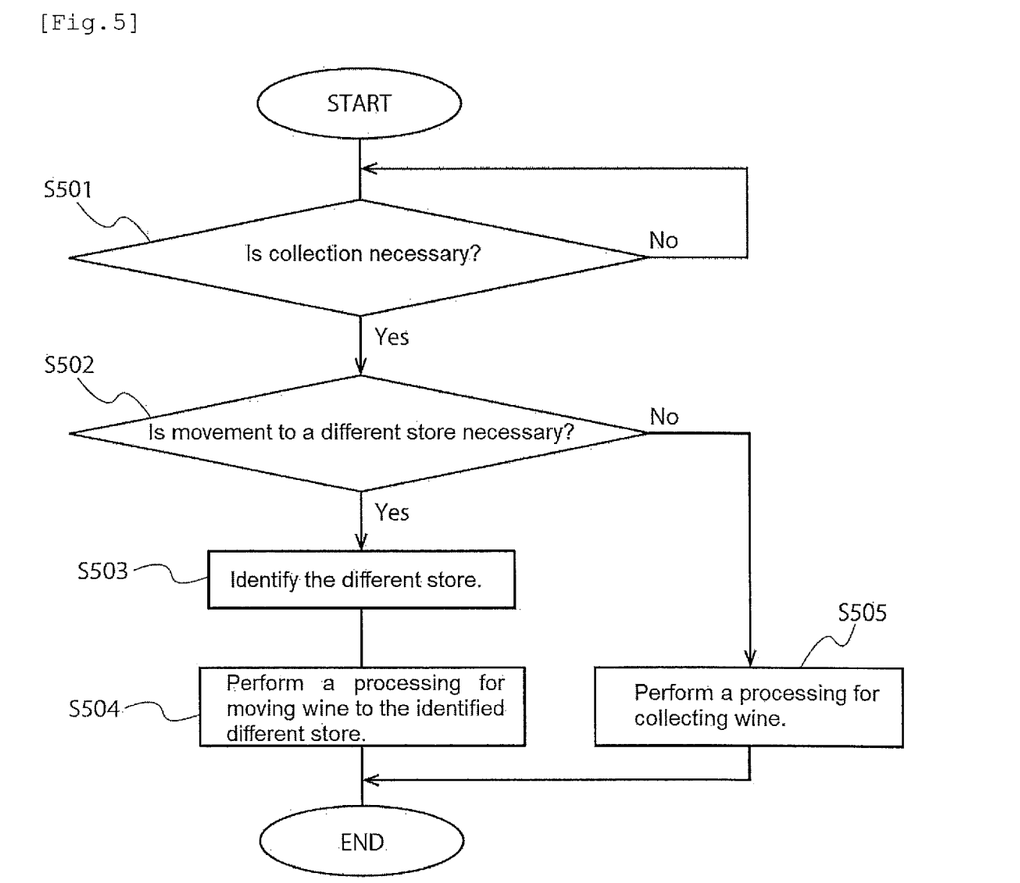
[FIG. 5] A drawing showing one example of a flow of a processing performed in a server apparatus 210.

The memory part 213 houses a program required for performing a processing, data required for performing a program and the like. For example, a program for performing the processing shown in FIG. 4 and FIG. 5 is housed in the memory part 213. In this regard, it does not matter how a program is housed in the memory part 213. For example, a program can be preinstalled in the memory part 213. Alternatively, a program can be installed in the memory part 213 by being downloaded via a network such as the internet 220, or a program can be installed in the memory part 213 through a storage medium such as an optical disk or a USB.

The processor part 212 controls the operation of the entirety of the server apparatus 210. The processor part 212 reads the program housed in the memory part 213 and performs the program. This enables the server apparatus 210 to function as an apparatus performing a desired step and function as a web server providing a website.

The database part 260 connected to the server apparatus 210 comprises a wine database part 261, a store database part 262 and an inventory database part 263.

Each of the at least one client apparatuses $220_1$ to $220_n$ is configured to be able to communicate with the server apparatus 210 through the internet 270. For example, the at least one client apparatuses $220_1$ to $220_n$ can be a personal computer such as a desktop PC, laptop PC or note PC, or a POS system such as a POS register equipped in a store.

The wine storage facility 230 is configured so that wine can be appropriately stored. For example, the wine storage facility 230 is configured so that the temperature and/or humidity inside the wine storage facility 230 can be retained within a predetermined range. One example of the wine storage facility 230 is, but not limited to, a wine cellar. The wine storage facility 230 can be an artificial facility or a natural facility. For example, the wine storage facility 230 can be a space (for example, an underground space) where an environment that is suitable for wine is naturally prepared.

The detection apparatus 240 is configured to be able to communicate with the at least one client apparatuses $220_1$ to $220_n$ through a network (not shown). The detection apparatus 240 is configured to transmit information (for example, wine ID) for identifying the wine taken out from the wine storage facility 230 to a client apparatus $220_1$ through a network when it is detected that wine stored in the wine storage facility 230 has been taken out from the wine storage facility 230. One example of the detection apparatus 240 is, but not limited to, an apparatus that detects an electric wave sent from an RF tag attached to wine. Alternatively, the detection apparatus 240 can be an apparatus that reads a bar code (for example, a primary bar code, a secondary bar code) affixed to wine.

Each of the at least one user apparatuses $250_1$ to $250_m$ is configured to be able to communicate with the server apparatus 210 through the internet 270. For example, each of the at least one user apparatuses $250_1$ to $250_m$ can be a portable wireless terminal such as a cell phone, smartphone, tablet terminal, smart glass or smart watch terminal, or a personal computer such as a desktop PC, laptop PC or note PC.

Furthermore, the embodiment shown in FIG. 2 shows one store with a broken line, which is shown as though one client apparatus $220_1$, one wine storage facility $230_1$ and one detection apparatus $240_1$ exist in that one store. However, the present invention is not limited to the above. A plurality of client apparatuses $220_1$ can be set, a plurality of wine storage facilities $230_1$ can be set and a plurality of detection apparatuses $240_1$ can be set in one store. In addition, it is shown as though a wine storage facility $230_1$ and a detection apparatus $240_1$ exist in the store. However, the present invention is not limited to the above. As long as it is possible for the detection apparatus $240_1$ to transmit information (for example, wine ID) for identifying the wine taken out from the wine storage facility $230_1$ to the client apparatuses $220_1$ through a network, the wine storage facility $230_1$ and/or the detection apparatuses $240_1$ can exist outside the store.

In addition, the embodiment shown in FIG. 2 explained that the at least one client apparatuses $220_1$ to $220_n$ and the at least one user apparatuses $250_1$ to $250_m$ can communicate with the server apparatus 210 through the internet 270. However, the present invention is not limited to the above. It is possible to use any type of network instead of the internet 270. In addition, a configuration, wherein the at least one client apparatuses $220_1$ to $220_n$ and the at least one user apparatuses $250_1$ to $250_m$ are electrically connected to the server apparatus 210 without through the internet 270 or any network instead of the internet 270, is also within the scope of the present invention. Furthermore, a system (i.e., a stand-alone type system) integrally incorporating both of the functions of the client apparatus $220_1$ and user apparatus $250_1$ and the function of the server apparatus 210 can be constructed as the server apparatus 210. Such a stand-alone type server apparatus 210 is also within the scope of the present invention.

In addition, the database part 260 is set outside the server apparatus 210 in the embodiment shown in FIG. 2. However, the present invention is not limited to the above. It is also possible to set the database part 260 inside the server apparatus 210. The configuration of the database part 260 is not limited to a specific hardware configuration. For example, the database part 260 can be configured with a single hardware part, or can be configured with a plurality of hardware parts. For example, the database part 260 can be configured as a single external hard disk apparatus of the sever 210, or can be configured as a storage on a cloud connected through a network. Furthermore, the configuration of each of the wine database part 261, store database part 262 and inventory database part 263 is also not limited to a specific hardware configuration. For example, the configuration of each of the wine database part 261, store database part 262 and inventory database part 263 also can be configured with a single hardware part, or can be configured with a plurality of hardware parts.

Figure 3A:
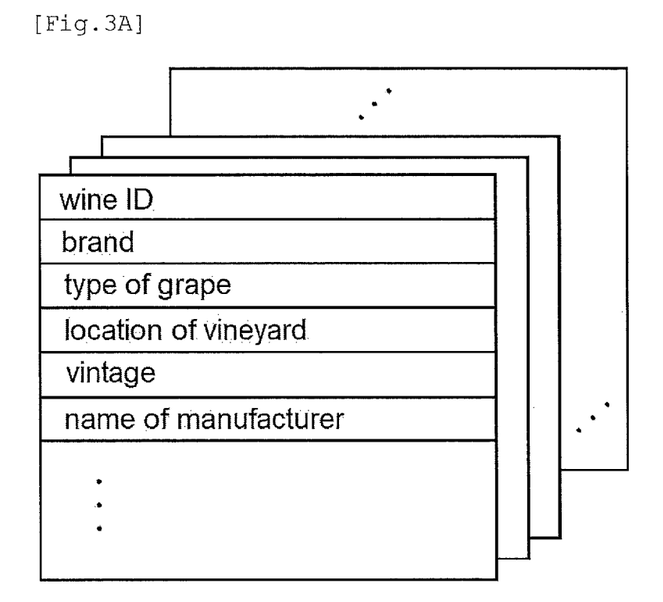
[FIG. 3A] A drawing showing one example of a configuration of information housed in a wine database part 261.

FIG. 3A shows one example of the information housed in the wine database part 261.

The wine database part 261 houses information regarding wine. The information regarding wine can be identified by information (for example, wine ID) for identifying wine. The wine database part 261 also houses, for example, brand of wine, type of grape, location of vineyard, vintage, name of manufacturer and the like.

Figure 3B:
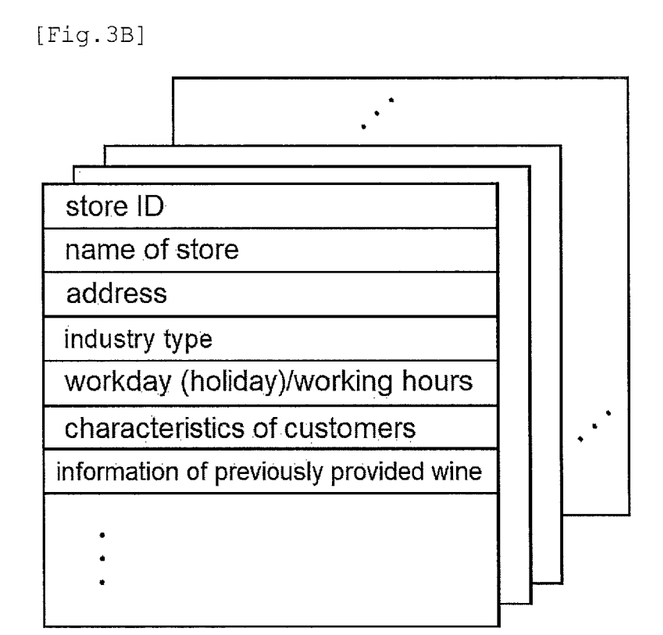
[FIG. 3B] A drawing showing one example of a configuration of information housed in a store database part 262.

FIG. 3B shows one example of a configuration of information housed in the store database part 262.

The store database part 262 houses information regarding stores. The information regarding stores can be identified by information (for example, store ID) for identifying stores. The store database part 262 also houses a store's name, address, industry type, workday (holiday)/working hours, characteristics of customers, information of previously provided wine and the like. The characteristics of customers includes, for example, age group of customers having high frequency of use and attributes of the customers (for example, male, female, couple, family, foreigner and the like).

Figure 3C:
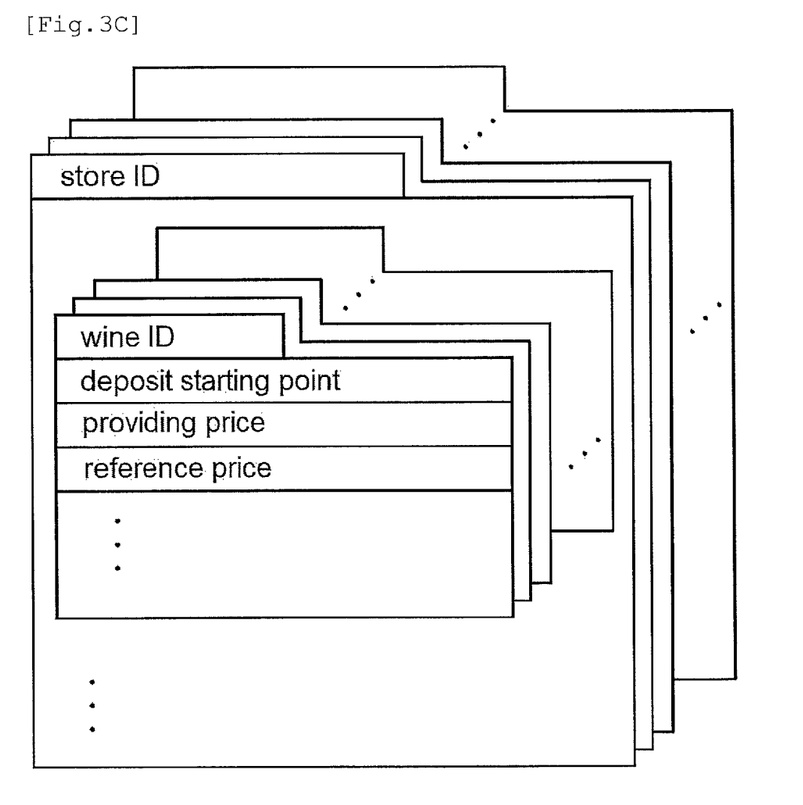
[FIG. 3C] A drawing showing one example of a configuration of information housed in an inventory database part 263.

FIG. 3C shows one example of a configuration of information housed in the inventory database 263.

The inventory database 263 houses information regarding inventory of each store. The information regarding inventory of each store is associated with the information (for example, wine ID) for identifying wine and the information (for example, store ID) for identifying stores. The information regarding inventory of each store shows assortment of wine store in the wine storage facility 230. For example, the information regarding inventory of each store includes, but not limited to, the wine's deposit starting point, providing price, reference price and the like.

3. The Processing of the System

FIG. 4 shows one example of a flow of a processing performed in the system 200 for providing wine to a customer. Each step shown in FIG. 4 is explained in detail below.

Step S401: The detection apparatus $240_1$ detects that the wine stored in the wine storage facility $230_1$ has been taken out from the wine storage facility $230_1$. It is considered that wine stored in the wine storage facility $230_1$ will be provided to a customer thereby.

Step S402: In response to the detection of wine stored in the wine storage facility $230_1$ being taken out from the wine storage facility $230_1$, the detection apparatus $240_1$ transmits the information (for example, wine ID) for identifying the wine (i.e., wine that is to be provided to a customer) taken out from the wine storage facility $230_1$ to the client apparatus $220_1$ through the internet 270.

Step S403: In response to the reception of the information (for example, wine ID) for identifying the wine taken out from the wine storage facility $230_1$ from the detection apparatus $240_1$ through the internet 270, the client apparatus $220_1$ transmits the information (for example, wine ID and store ID) related to the wine of the store associated with the client apparatus $220_1$ to the server apparatus 210 through the internet 270.

Step S404: In response to the reception of the information (for example, wine ID, store ID) related to the wine of the store associated with the client apparatus $220_1$ from the client apparatus $220_1$ through the internet 270, the server apparatus 210 updates the information regarding inventory of each store housed in the inventory database part 263 based on the information (for example, wine ID, store ID) related to the wine. As such, the server apparatus 210 updates the information regarding inventory of each store housed in the inventory database part 263 when wine stored in the wine storage facility $230_1$ has been taken out from the wine storage facility $230_1$.

Step S405: The server apparatus 210 performs a processing of imposing fee for wine provided to a customer on the seller based on the information (for example, wine ID, store ID) related to the wine of the store associated with the client apparatus $220_1$. In this processing, the server apparatus 210 does not necessarily require performance of a processing of issuing an invoice for charging fee for wine provided to a customer. The server apparatus 210 can perform the processing of issuing an invoice for charging fee for wine provided to a customer later on another day. As such, in response to the detection apparatus $240_1$ detecting that wine stored in the wine storage facility $230_1$ has been taken out from the wine storage facility $230_1$, the server apparatus 210 performs the processing of imposing fee for the wine on the seller.

Furthermore, the above-described embodiment explained that the detection apparatus $240_1$ is a detection apparatus that detects that wine stored in the wine storage facility $230_1$ has been taken out from the wine storage facility $230_1$. However, the present invention is not limited to the above. For example, the detection apparatus $240_1$ can be a detection apparatus that detects that wine has been ordered, a detection apparatus that detects that wine has been uncorked, or a detection apparatus that detects that a customer has carried out a payment processing of wine.

In addition, above-described embodiment explained that in response to the detection of wine stored in the wine storage facility $230_1$ being taken out from the wine storage facility $230_1$, the server apparatus 210 performs the processing of imposing fee for the wine on a seller. However, the present invention is not limited to the, above. When wine stored in the wine storage facility $230_1$ is provided to a customer, the server apparatus 210 performs the processing of imposing fee for the wine on a seller. For example, the server apparatus 210 can perform the processing of imposing fee for wine to a seller in response to a detection apparatus detecting that the wine has been ordered, perform the processing of imposing fee for wine to a seller in response to a detection apparatus detecting that the wine has been uncorked, or perform the processing of imposing fee for wine to a seller in response to a detection apparatus detecting that a customer has carried out a payment processing of wine.

In addition, in the above-described embodiment, when wine stored in the wine storage facility $230_1$ is returned to the wine storage facility $230_1$ as it is after once being taken out from the wine storage facility $230_1$, the processing of imposing fee for the wine on a seller can be cancelled by (for example, manually) transmitting an input for cancelling the processing of imposing fee for the wine on a seller from the client apparatus $220_1$ to the server apparatus 210 through the internet 270.

In addition, in the above-described embodiment, the server apparatus 210 can update the information regarding inventory of each store housed in the inventory database part 263 when wine is deposited in the wine storage facility $230_1$ in addition to when wine stored in the wine storage facility $230_1$ has been taken out from the wine storage facility $230_1$.

In addition, in the above-described embodiment, the server apparatus 210 can update the information regarding inventory of each store housed in the inventory database part 263 at any timing so as to raise the price of wine stored in the wine storage facility $230_1$. For example, in response to reception (for example, from the user apparatus $250_1$) of an input showing that the price of wine stored in the wine storage facility $230_1$ is to be increased, the server apparatus 210 can update the information regarding inventory of each store housed in the inventory database part 263 so as to raise the price of the wine. Alternatively, the server apparatus 210 can automatically update the information regarding inventory of each store housed in the inventory database part 263 so as to raise the price of wine stored in the wine storage facility $230_1$ after a predetermined period of time has passed.

In addition, the above-described embodiment is shown as though step S405 is performed after step S404. However, the present invention is not limited to the above. Step S405 can be performed at any timing after step S403. FIG. 5 shows one example of a flow of a processing performed in the server apparatus 210. For example, this processing is performed by the processor part 212 comprised in the server apparatus 210. Each step shown in FIG. 5 is explained in detail below.

Step S501: It is decided whether or not wine stored in the wine storage facility 230 should be collected from the seller's store. In a case wherein the result of this decision is "Yes", the processing will proceed to step S502 and in a case wherein the result of this decision is "No", the processing will return to step S501. As one example, when a predetermined period of time has passed since the start of the deposit of wine stored in the wine storage facility 230, it is decided that the wine stored in the wine storage facility 230 should be collected from the seller's store. As another example, when wine stored in the wine storage facility 230 has passed a predetermined period of time since the manufacturing year of the wine, it is decided that the wine stored in the wine storage facility 230 should be collected from the seller's store.

Step S502: It is decided whether or not the wine to be collected should be moved to a different store. In a case wherein the result of this decision is "Yes", the processing will proceed to Step S503 and in a case wherein the result of this decision is "No", the processing will proceed to Step S505.

Step S503: The different store, which is the destination of the wine to be collected, is identified. For example, based on the information regarding stores, a different store closest to the store having the wine storage facility where the wine had been stored can be identified as the destination, a different store that sold the same brand as in the wine to be collected can be identified as the destination, a different store with high sales number of wine can be identified as the destination, a different store with high price range can be identified as the destination, or a different store with a high profit rate can be identified as the destination. Alternatively, the different store can be identified based on the characteristics of customers (for example, for families, for young women, for couples). Alternatively, the different store can be identified in accordance with the vintage of the wine based on the information regarding wine. Alternatively, the server apparatus 210 (more specifically, the processor part 212 of the server apparatus 210) can automatically suggest candidates for the different store that is the destination of the wine to be collected (for example, based on the information regarding inventory of each store) and the different store that is the destination can be identified in accordance with an input from the wholesaler.

Step S504: A processing for moving the wine to an identified different store is performed. One example of the processing for moving the wine to the identified different store is, but not limited to, a processing of arranging delivery of the wine to the identified different store.

Step S505: A processing for collecting the wine is performed. One example of the processing for collecting the wine is, but not limited to, a processing of arranging delivery of the wine to the wholesaler's warehouse where the wine is stored.

In addition, in step S501, for example, when the server apparatus 210 compared the seller's store and the different store based on the information regarding inventory of each store and decided that the sales number of a specific brand of wine is higher in the different store than in the seller's store, it can be decided that the specific brand of wine should be collected. In such a case, step S502 and step S503 are not needed.

In addition, the server apparatus 210 can update the information regarding inventory of each store housed in the inventory database part 263 at any timing of steps S502 to S504 so that the providing price in the store after the movement is higher than the providing price in the store before the movement (utilizing a property unique to wine which is that the value thereof increases over time). This enables wine to be sold at a price corresponding to the increase of its value over time in the store after the movement.

In addition, the above-described embodiment explained that the processor part 212 comprised in the server apparatus 210 performs the processing shown in each step of FIG. 5. However, the present invention is not limited to the above. As long as the server apparatus 210 comprises a means for performing the processing shown in each step of FIG. 4 and FIG. 5 as a function, a component other than the processor part 212 can perform the processing shown in each step of FIG. 4 and FIG. 5. Alternatively, as long as the system 200 comprises a means for performing the processing shown in each step of FIG. 4 and FIG. 5, a component other than the server apparatus 210 can perform the processing shown in each step of FIG. 4 and FIG. 5.

In addition, the above-described embodiment explained that FIG. 1A shows one example of a flow of a new service provided as a "service for a seller's stores". However, this is an explanation using a case, wherein the wine storage facility shown in FIG. 1A is set in the seller's store, as an example and those skilled in the art can readily understand that a case, wherein the wine storage facility shown in FIG. 1A is set outside the seller's store, is also within the scope of the present invention. This is because it is clear that the nature of the flow shown in FIG. 1A is to deposit wine in the wine storage facility in step S101 and provide wine stored in the wine storage facility to a customer in step S102 and it is clear that there is no change in the flow shown in FIG. 1A even in a case wherein the wine storage facility is set at a location other than the seller's store. In other words, the wine storage facility can be set at any location including the seller's store.

In addition, the above-described embodiment explained that FIG. 1A shows one example of a flow of a new service provided as a "service for a seller's stores". However, this is an explanation using a case, wherein the seller is the person to whom the fee for wine is charged, as an example in association with the setting of the wine storage facility in the seller's store and those skilled in the art can readily understand that a case, wherein the person to whom the fee for wine is charged is a person other than the seller, is also within the scope of the present invention in association with the setting of the wine storage facility at a location other than the seller's store.

Specifically, one example of the location where the wine storage facility is set is one section of a detached house (for example, a specific room in a detached house). This wine storage facility can be a facility which had been owned by the resident of the detached house, a facility purchased by the resident of the detached house (for example, purchased from the wholesaler) or a facility rented by the resident of the detached house (for example, rented from the wholesaler).

The wholesaler deposits wine in the wine storage facility set in one section of the detached house. This step is the same as in step S101 of FIG. 1A.

Wine stored in the wine storage facility is provided to the resident of the detached house. This is because the resident of the detached house is a customer. This step is the same as in step S102 of FIG. 1A. Provision of the wine stored in the wine storage facility to the resident of the detached house can be achieved by, for example, the resident of the detached house taking out the wine from the wine storage facility. For example, when a detection apparatus set in the wine storage facility detects that wine has been taken out from the wine storage facility, it is decided that the wine stored in the wine storage facility has been provided to the resident of the detached house.

When the wine stored in the wine storage facility is provided to the resident of the detached house, the information regarding the provided wine is provided to the wholesaler. This step is the same as in step S103 in FIG. 1A. The wholesaler charges the fee for the wine to the resident of the detached house based on the information regarding the provided wine. This is because the person to whom the fee for the wine is charged is the resident of the detached house.

The wholesaler charges the fee for the wine to the resident of the detached house. This step is the same as in step S104 of FIG. 1A except that the person to whom the bill for the wine is charged is the resident of the detached house. This is because the person to whom the bill for the wine is charged is the resident of the detached house in association with the setting of the wine storage facility in one section of the detached house.

The resident of the detached house to whom the fee for the wine was charged pays the fee for the wine to the wholesaler. The mode of payment of the fee for the wine does not matter. For example, the resident of the detached house can pay the wholesaler the fee for the wine in any settlement method such as cash, bank transfer, card settlement, or app settlement.

In addition, a seller can deposit wine in the wine storage facility set in one section of the detached house instead of the wholesaler. In this case, the information regarding the provided wine is provided to the seller. The seller imposes the fee for the wine on the resident of the detached house based on the information regarding the provided wine. Later, the seller charges the fee for the wine to the resident of the detached house. In this case, the resident of the detached house to whom the fee for the wine was charged pays the seller the fee for the wine. Alternatively, the wholesaler can also work as the seller.

As described above, it is possible to create a new service for providing wine to a customer by depositing wine to a wine storage facility set in one section of a detached house and imposing fee for wine to the resident of the detached house when wine stored in the wine storage facility is provided to the resident of the detached house. According to this new service, the resident of the detached house can enjoy any wine at any timing because the wine storage facility is in the house.

In addition, the above-described embodiment was explained using a case, wherein a wine storage facility is set in one section of a detached house, as an example. However, the same explanation as in the above-described explanation is also applied to a case wherein a wine storage facility is set in a room exclusively owned by a resident of an apartment (i.e., an exclusively owned portion of an apartment). In this case, the person to whom the fee for wine is charged is the resident of the apartment.

One different example of a location where a wine storage facility is set is a common portion of the apartment (for example, a space where the concierge of the apartment is stationed, the reception portion of the apartment). This wine storage facility can be a facility that had been owned by the manager of the apartment (for example, the management association in a case wherein the apartment is a condominium apartment, the apartment owner in a case wherein the apartment is a rental apartment), a facility purchased by the manager of the apartment (for example, purchased from a wholesaler), or a facility rented by the manager of the apartment (for example, rented from a wholesaler).

The wholesaler deposits wine in wine storage facility set in the common part of the apartment. This step is the same as in step S101 of FIG. 1A.

The wine stored in the wine storage facility is provided to a resident of the apartment. This is because the resident of the apartment is a customer. This step is the same as in step S102 of FIG. 1A. The provision of the wine stored in the wine storage facility to the resident of the apartment is achieved by, for example, the concierge of the apartment taking out the wine stored in the wine storage facility and delivering the wine that was taken out to the resident of the apartment. Alternatively, the provision of the wine stored in the wine storage facility to the resident of the apartment is achieved by the resident of the apartment personally taking out the wine stored in the wine storage facility. For example, when a detection apparatus set in the wine storage facility detects that wine has been taken out from the wine storage facility, it will be decided that the wine stored in the wine storage facility has been provided to the resident of the apartment.

When wine stored in the wine storage facility is provided to the resident of the apartment, the information regarding the provided wine will be provided to the wholesaler. This step is the same as in step S103 of FIG. 1A. The wholesaler imposes the fee for the wine to the manager of the apartment (for example, the management association in a case wherein the apartment is a condominium apartment, the apartment owner in a case wherein the apartment is a rental apartment) based on the information regarding the provided wine. This is because the person to whom the fee for the wine is charged is the manager of the apartment.

The wholesaler charges the fee for the wine to the manager of the apartment. This step is the same as in step S104 of FIG. 1A except that the person to whom the fee for the wine is charged is the manager of the apartment. This is because the person to whom the fee for the wine is charge is the manager of the apartment in association with the setting of the wine storage facility in the common portion of the apartment.

The manager of the apartment to whom the fee for the wine was charged pays the fee for the wine to the wholesaler. The timing of the payment of the fee for the wine does not matter. In addition, the mode of the payment of the fee for the wine also does not matter. For example, the manager of the apartment can pay the wholesaler the fee for the wine in any settlement method such as cash, bank transfer, card settlement, or app settlement.

The manager of the apartment collects the fee for the wine from the resident of the apartment to whom the wine was provided. The timing of the collection of the fee for the wine does not matter. In addition, the mode of the collection of the fee for the wine also does not matter. For example, the manager of the apartment can ask the resident of the apartment for payment of the fee for the wine in any settlement method such as cash, bank transfer, card settlement, or app settlement. In a case wherein the apartment is a rental apartment, the manager of the apartment can ask the resident of the apartment for the payment of the fee for the wine together with payment of rent. Alternatively, the manager of the apartment can chose not to collect the fee for the wine (for example, the fee for the wine as a birthday present given from the apartment on the birthday of the resident of the apartment) from the resident of the apartment to whom the wine was provided. This allows improvement of the reputation of the apartment as "the apartment that gives wine on birthdays".

In addition, a seller can deposit wine in the wine storage facility set in the common portion of the apartment instead of the wholesaler. In this case, the information regarding the provided wine will be provided to the seller. The seller imposes the fee for the wine on the manager of the apartment based on the information regarding the provided wine. Later, the seller charges the fee for the wine to the manager of the apartment. In this case, the manager of the apartment to whom the fee for the wine has been charged pays the seller the fee for the wine. Alternatively, the wholesaler can also work as the seller.

As described above, it is possible to create a new service for providing wine to a customer by depositing wine in a wine storage facility set in a common portion of an apartment and imposing fee for wine to a manager of the apartment when wine stored in the wine storage facility is provided to a resident of the apartment. This new service can be added to conventional concierge services. According to this new service, the resident of the apartment can enjoy any wine at any timing since the wine storage facility is right near home. Specifically, in a case wherein a space where wine can be drunk is set together with the common portion of the apartment, the resident of the apartment can drink and enjoy wine at the common portion of the apartment in addition to drinking and enjoying wine at home. This helps increase in amity among residents of the apartment. This is considered beneficial to the residents of the apartment. In addition, according to this new service, it is possible to attempt differentiation from other apartments that cannot provide the same service. This helps increase of the value of the apartment. This is considered beneficial to the manager of the apartment.

In addition, the above-described "service for managing inventory of wine in a wine storage facility" can be provided to the resident of the manager of the apartment or the resident of the apartment or the resident of the detached house with reference to FIG. 1A. In other words, the manager of the apartment or the resident of the apartment or the resident of the detached house can utilize an application program for realizing the "service for managing inventory of wine in a wine storage facility" using the user apparatus.

In addition, the above-described wine list of the "service for a consumer" can be provided to the resident of the apartment or the resident of the detached house with reference to FIG. 1B. This enables the resident of the apartment or the resident of the detached house to obtain information regarding the price of wine (providing price of wine, reference prince of wine (for example, the maximum price on the internet, the minimum price on the internet, the average price on the internet)).

In addition, it is possible to deposit wine with high cost performance selected by a specialist of wine, wine with progressed maturation that is difficult to obtain in market, wine with the price range close to the cheapest price on the internet and the like in the wine storage facility. By depositing such wine in the wine storage facility, the resident of the apartment or the resident of the detached house can gain benefit in terms of cost performance of wine, rarity of wine, price of wine and the like.

In addition, the wine storage facility can store wine ordered and purchase personally by the resident of the apartment or the resident of the detached house. The resident of the apartment or the resident of the detached house can, for example, order and purchase wine for an event (for example, a birthday), the wine the resident wants, or favorite wine via the internet and store the purchased wine in the wine storage facility. However, in this case, the purchased wine has already been settled. Thus, no charges will occur when the purchased wine is provided to an individual.

Although the present invention has been exemplified using a preferable embodiment of the present invention as described above, the interpretation of the present invention should not be limited to this embodiment. It is understood that the scope of the present invention should be interpreted by the Claims alone. It is understood that those skilled in the art can practice an equivalent scope based on the description of the present invention and common general knowledge from the description of the specific and preferable embodiment of the present application.

INDUSTRIAL APPLICABILITY

The present invention is useful as an invention providing a system and a method that enables creation of a new service for providing wine to a customer and a server apparatus, program and the like used in the system.

REFERENCE SIGNS LIST 210 server apparatus
211 interface part
212 processor part
213 memory part
$220_1$ to $220_n$ client apparatuses
230 wine storage facility
240 detection apparatus
$250_1$ to $250_m$ user apparatuses
260 database part
261 wine database part
262 storage database part
263 inventory database part
270 internet

The invention claimed is:

1. A system for providing wine to a customer, the system comprising:
  a wine storage facility for storing wine, wherein wine is deposited in the wine storage facility;
  a detection apparatus configured to be able to detect that wine has been taken out from the wine storage facility; and
  a server apparatus configured to be able to communicate with the detection apparatus,
  wherein the server apparatus comprises a processor part configured to:
    in response to the detection apparatus detecting that wine has been taken out from the wine storage facility, impose fee for the wine that has been taken out from the wine storage facility; and
    in response to the processor part determining that wine in the wine storage facility should be collected from the wine storage facility, determine to move the collected wine to a different wine storage facility than the wine storage facility.

2. The system of claim 1, wherein the processor part is further configured to manage assortment of wine in the wine storage facility.

3. The system of claim 2, wherein the processor part is further configured to update data showing assortment of wine in the wine storage facility when wine is deposited in the wine storage facility or when wine is taken out from the wine storage facility.

4. The system of claim 1, wherein the server apparatus is configured to provide a web site that enables a customer to search providable wine of a wholesaler.

5. The system of claim 1, wherein the server apparatus is configured to present a wine list wherein a wine providing price and a wine reference price are written together, wherein the wholesaler has a right to determine the wine providing price.

6. The system of claim 5, wherein wine information inserted in the wine list is based on wine stored in the wine storage facility.

7. The system of claim 1, wherein the wine storage facility is set in a seller's store and the processor part is configured to impose fee for wine on a seller of wine.

8. The system of claim 1, wherein the wine storage facility is set at a location other than a seller's store.

9. A method for providing wine to a customer, the method comprising:
  depositing wine in a wine storage facility;
  detecting, by a detection apparatus, that wine has been taken out from the wine storage facility;
  in response to the detection apparatus detecting that wine has been taken out from the wine storage facility, imposing, by a processor part configured to be able to communicate with the detection apparatus, fee for the wine that has been taken out from the wine storage facility; and
  in response to determining, by the processor part, that wine in the wine storage facility should be collected from the wine storage facility, determining, by the processor part, to move the collected wine to a different wine storage facility than the wine storage facility.

10. A system for providing wine to a customer,
  wherein the system comprises a server apparatus, a detection apparatus, and a client apparatus, wherein the server apparatus is configured to be able to communicate with the client apparatus and the detection apparatus through a network, wherein wine is deposited in a wine storage facility, wherein the detection apparatus is configured to be able to detect that wine has been taken out from the wine storage facility, wherein the client apparatus transmits information regarding wine to the server apparatus through the network in response to the detection apparatus detecting that wine has been taken out from the wine storage facility, wherein the server apparatus performs a processing of:
- imposing fee for the wine that has been taken out from the wine storage facility based on the information regarding wine transmitted from the client apparatus through the network; and
- in response to the server apparatus determining that wine in the wine storage facility should be collected from the wine storage facility, determining to move the collected wine to a different wine storage facility than the wine storage facility.

11. A server apparatus used in a system for providing wine to a customer, wherein the server apparatus is configured to be able to communicate with a client apparatus and a detection apparatus through a network, wherein wine is deposited in a wine storage facility, wherein the detection apparatus is configured to be able to detect that wine has been taken out from the wine storage facility, wherein the server apparatus comprises a processor part, wherein the processor part is configured to perform a processing of:
- in response to the detection apparatus detecting that wine has been taken out from the wine storage facility, imposing fee for the wine that has been taken out from the wine storage facility based on the information regarding wine transmitted from the client apparatus through the network; and
- in response to the processor part determining that wine in the wine storage facility should be collected from the wine storage facility, determining to move the collected wine to a different wine storage facility than the wine storage facility.

12. A non-transitory computer-readable medium having a program stored thereon, the program performed in a server apparatus used in a system for providing wine to a customer, wherein the server apparatus is configured to be able to communicate with a client apparatus and a detection apparatus through a network, wherein wine is deposited in a wine storage facility, wherein the detection apparatus is configured to be able to detect that wine has been taken out from the wine storage facility, wherein the server apparatus comprises a processor part, wherein when performed by the processor part, the program have the processor part perform a processing of:
- in response to the detection apparatus detecting that wine has been taken out from the wine storage facility, imposing fee for the wine that has been taken out from the wine storage facility based on the information regarding wine transmitted from the client apparatus through the network; and
- in response to the processor part determining that wine in the wine storage facility should be collected from the wine storage facility, determining to move the collected wine to a different wine storage facility than the wine storage facility.

* * * * *